United States Patent Office 3,225,034
Patented Dec. 21, 1965

3,225,034
2β-AMINO-STEROIDS
Colin L. Hewett, Bearsden, Glasgow, and David S. Savage, Newton Mearns, Glasgow, Scotland, assignors to Organon Inc., West Orange, N.J., a corporation of New Jersey
No Drawing. Filed June 21, 1963, Ser. No. 289,714
Claims priority, application Great Britain, July 9, 1962, 26,267/62
2 Claims. (Cl. 260—239.5)

This invention relates to novel 2β-amino-steroids and to a process for the preparation thereof.

More particularly, this invention relates to the preparation of 2β-amino-3α-hydroxy- and 3-acyloxy-5α-steroids of the androstane and pregnane series, and to salts of these compounds.

In particular, the invention relates to novel steroids of the general formula:

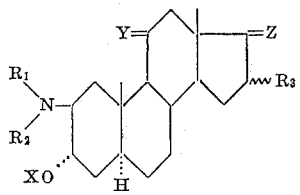

in which

X represents hydrogen or an acyl radical,
Y represents $H_2$, H(OH), H(Oacyl) or O,
Z represents $H(COCH_3)$, $OX(COCH_3)$, $H(CHOXCH_3)$, $OX(CHOXCH_3)$ $\alpha P(\beta OX)$ and O, wherein X has the meaning as defined above, and P represents hydrogen or a saturated or unsaturated alkyl radical,
$R_1 + R_2$ represents hydrogen, a lower alkyl or substituted lower alkyl group or when taken together form a heterocyclic ring, and
$R_3$ represents hydrogen or a lower alkyl radical, and salts of these compounds.

The compounds of the present invention possess valuable biological activities. They have anesthetic, analgesic, anticonvulsive, sedative and hypotensive properties.

The compounds are prepared by reacting a 2α,3α-oxido-5α-steroid of the androstane or pregnane series with an amine having the formula $HNR_1R_2$, $R_1$ and $R_2$ being as defined above.

The reaction may be carried out by heating the reagents together, preferably at a temperature below 140° C. In case lower boiling amines are used the reaction is by preference carried out under pressure. It may be of advantageous to perform the present reaction in the presence of water.

Starting products in the process according to the invention are 2α,3α-oxido-5α-steroids of the androstane and pregnane series. These starting products may be prepared from the corresponding Δ²-steroids by treating them with a peracid, such as perphthalic acid or perbenzoic acid. The oxidation-reaction gives predominantly the 2α,3α-oxido-compound which may be purified by crystallization. The Δ²-5α-steroids of the androstane and pregnane series may in turn be prepared for example, by heating a sulfonyloxy-compound, e.g. the 3-tosyloxy-steroid, in a base such as collidine to temperatures above 150° C.

A special group of starting products may be illustrated by the following structural formula:

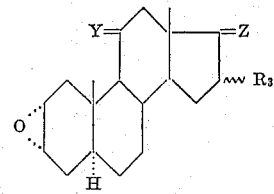

in which Y, Z and $R_3$ have the meanings as defined above.

The compound having the formula $HNR_1R_2$ applied in the reaction according to the invention may be a primary amine of the formula $NH_2$ (alkyl), a secondary amine of the formula NH (alkyl)$_2$ or a heterocyclic amino compound, preferably morpholine or piperidine.

The alkyl group is preferably a lower alkyl group having one to six carbon atoms, or a substituted lower alkyl group.

After the formation of the desired 2β-amino-3α-hydroxy-steroids further conversions can be performed in the molecule.

Free hydroxyl groups other than 3α-hydroxyl groups if present in the 2β-amino-3α-hydroxy-5α steroids according to the invention may readily be oxidized to the corresponding ketones by known methods, for example, chromic acid in the presence of sulphuric acid. The 3α-hydroxyl group is not readily oxidised. It is thus possible to oxidise preferentially hydroxyl groups present other than the 3α-hydroxyl group.

By the esterification of the esterifiable hydroxyl groups of the 2β-amino-3α-hydroxy-5α steroids there may be prepared the esters thereof, for example with an organic acid such as acetic acid, butyric acid, valeric acid, caproic acid, oenanthic acid, decanoic acid, lauric acid, trimethyl acetic acid, cyclohexyl butyric acid, phenyl propionic acid, succinic acid and pyruvic acid, or with an inorganic acid, for example phosphoric acid.

The 2β-amino-3α-hydroxy-5α-steroids according to the present invention may be converted into salts thereof, for example, organic salts such as citrates or pyruvates or inorganic salts such as hydrochlorides or they may be converted into the quaternary ammonium salts with alkyl halides.

EXAMPLES (1) 5α-androst-2-en-17-one

Epiandrosterone tosylate (90 g.) was added to an almost boiling solution of collidine (270 ml.) and the solution boiled under reflux for 1 hour under anhydrous conditions. The solution was cooled before pouring into a dilute hydrochloric acid solution to precipitate a crystalline solid which was filtered off and washed to neutrality with water. This solid was taken up in ether, dried ($Na_2SO_4$), concentrated, and hexane added before concentrating to a n-hexane solution which was cooled and filtered through a column (3 x 2" dia.) of alumina. Then n-hexane fraction was concentrated to give 5α-androst-2-en-17-one in needles (53 g.), M.P. 108–109°, $$[\alpha]_D^{EtOH} +144° \text{ (c. 2)}$$

2α,3α-epoxy-5α-androstan-17-one

A solution of monoperphthalic acid (2 moles) in ethyl acetate (480 ml.) was added to a solution of 5α-androst- 2-en-17-one (44 g.) in ethyl acetate (300 ml.) and allowed to stand at 18° for 5 hours. The solution was washed alkaline with 1 N caustic soda solution, washed neutral with water and dried (Na₂SO₄). Evaporation to dryness and crystallisation of the residue from methanol yielded the 2α,3α-epoxide in blades (35 g.), M.P. 125–127°, $$[\alpha]_D^{CHCl_3} +105° \text{ (c. 1.5)}$$

*2β-morpholino-3α-hydroxy-5α-androstan-17-one*

A solution of 2α,3α-epoxy-5α-androstan-17-one (15 g.) in morpholino (35 ml.) and water (5 ml.) was boiled under reflux for 72 hours. The product was precipitated by the careful addition of water, filtered off and well washed with water. The white solid was dissolved in ether and extracted with 0.5 NHCl solution. Basification of the acid extract with 10 N potassium hydroxide solution gave a white solid which was extracted with ether and the ether extract well washed with water, dried (Na₂SO₄), and concentrated before adding n-hexane. Crystallisation from hexane yielded 2β-morpholino-3α-hydroxy-5α-androstan-17-one in blades (3.4 g.), M.P. 170–172°, $$[\alpha]_D^{EtOH} +85° \text{ (c. 2)}$$

(Found C, 73.45; H, 9.95; N, 3.43. C₂₃H₃₇O₃N requires C, 73.58; H, 9.92; N, 3.72%.)

In an analogous manner 2α,3α-epoxy-5α-androstan-17-one has been converted into the corresponding 2β-amino-3α-hydroxy-derivatives, of which the amino-substituent is derived from dimethylamine, diethylamine and propylamine.

(2) *2β-piperidino-3α-hydroxy-5α-androstan-17-one*

A solution of 2α,3α-epoxy-5α-androstan-17-one (5 g.) in piperidine (40 ml.) and water (5 ml.) was boiled under reflux for 1 week, cooled and the product worked up as described above. Crystallisation from ethyl acetate gave 2β-piperidine-3α-hydroxy-5α-androstan-17-one in small prisms (3.4 g.), M.P. 252–256° (dec.), $$[\alpha]_D^{EtOH} +109° \text{ (c. 1)}$$

(Found: C, 76.87; H, 10.29; N, 3.33. C₂₄H₃₉O₂N requires C, 77.10; H, 10.52; N, 3.74%.)

Acetylation with acetic anhydride, butyric acid anhydride and caprylic acid chloride there are obtained the corresponding 3-acylates.

In the same way 2β-amino-3α-hydroxy-5α-androstan-17-one-compounds, described in the preceding example, have been converted into the 3-acetates, 3-decanoates and 3-succinates.

(3) *N-(3α-acetoxy-17-oxo-5α-androstanyl)-2β-trimethylammonium bromide*

A solution of dimethylamino-androsterone-acetate and methyl bromide (5 ml.) in chloroform (70 ml.) was kept in a sealed bottle at room temperature for 5 days. The solution was then evaporated to dryness and the water soluble residue crystallised from acetone to give the methobromide in needles (1.18 g.), M.P. 235–239°, $$[\alpha]_D^{H_2O} +152° \text{ (c. 1)}$$

(Found: C, 60.67; H, 8.32; N, 3.08; Br, 17.45. C₂₄H₃₈O₃NBr requires C, 61.24; H, 8.49; N, 2.98; Br, 17.0%.)

(4) *Morpholino-3α-hydroxy-5α-androstan-17β-ol*

Sodium borohydride (2 g.) was added to a solution of 2α,3α-epoxy-5α-androstan-17-one (10 g.) in methanol (200 ml.) and the solution stirred for 1 hour at room temperature. After working up in the usual manner, crystallisation from ether-hexane gave the epoxy-alcohol in small prisms (4.1 g.), M.P. 183–188°. A solution of 2α,3α-epoxy-5α-androstan-17β-ol (1.7 g.) in morpholino (7 ml.) and water (2 ml.) was boiled under reflux for 66 hours, cooled, and the product precipitated by the addition of water. The product was dissolved in a little acetic acid, and neutral material precipitated by dilution with water. After filtration the basic material was precipitated by addition of 10 N caustic potash solution to the acid filtrate. The precipitated base was taken up in ether, washed with water and dried (Na₂SO₄). Concentration of the ether solution yielded 2β-morpholino-3α-hydroxy-5α-androstan-17β-ol in needles (1.7 g.), M.P. 193–195°, $$[\alpha]_D^{EtOH} +26° \text{ (c. 1)}$$

(Found: C, 73.33; H, 10.29; N, 3.16. C₂₃H₃₉O₃N requires C, 73.6; H, 10.4; N, 3.72%.)

Acetylation with acetic anhydride in pyridine yielded the diacetate, M.P. 165–168°, $$[\alpha]_D^{EtOH} +24° \text{ (c. 1)}$$

(Found: C, 69.77; H, 9.06; N, 2.71. C₂₇H₄₃O₅N requires C, 70.25; H, 9.38; N, 3.03%.)

Using valeric anhydride, oenanthic acid chloride, succinic acid anhydride and β-phenylpropionic acid chloride there are obtained the corresponding 3,17-di-esters.

(5) *5α-pregn-2-en-20-one*

A solution of 5α-pregnanolone tosylate (105 g.) in collidine (260 ml.) was boiled under reflux for 40 minutes, cooled and poured into dilute hydrochloric acid solution. The crystalline precipitate was well washed with water, taken up in hexane, the solution dried (Na₂SO₄) and filtered down a column (6 x 1½″ dia.) of alumina. Concentration of the n-hexane eluate gave 5α-pregn-2-en-20-one in prisms (43 g.) M.P. 127–129°.

$$[\alpha]_D^{EtOH} +135° \text{ (c. 2)}$$

*2α,3α-epoxy-5α-pregnan-20-one*

A solution of monoperphthalic acid (2 moles) in ethyl acetate (410 ml.) was added to 5α-pregn-2-en-20-one (62 g.) in ethyl acetate (500 ml.) and the solution allowed to stand at room temperature for 4½ hours. The product was worked up in the usual manner and recrystallisation from methanol to give 2α,3α-epoxy-5α-pregnan-20-one in prisms (19 g.), M.P. 152–156°, $$[\alpha]_D^{EtOH} +103° \text{ (c. 2)}$$

(Found: C, 80.18; C, 10.13. C₂₁H₃₂O₂ requires C, 79.70; H, 10.19%.)

*2β-morpholino-3α-hydroxy-5α-pregnan-20-one*

A solution of the 2α,3α-epoxide (3 g.) in morpholine (25 ml.) and water (8 ml.) was boiled under reflux for 41 hours, evaporated to dryness, and the residual yellow gum dissolved in acetic acid (20 ml.). Water was added and the acid solution filtered before basifying with 10 N caustic potash solution. The basic precipitate was extracted with ether, dried (Na₂SO₄) and concentrated to give 2β-morpholino-3α-hydroxy-5α-pregnan-20-one in needles (1.8 g.), 188–192°, $$[\alpha]_D^{EtOH} +76° \text{ (c. 2)}$$

(Found: C, 74.68; H, 10.03; N, 3.44. C₂₅H₄₁O₃N requires C, 74.40; H, 10.23; N, 3.47%.)

The 3-acetate of this compound has a melting point of 125–127° C. [α]_D=+75° (ethanol).

In accordance with the method described above 2α,3α-epoxy-5α-pregnan-20-one has been converted into the corresponding 2β-amino-compounds derived from dimethylamine, diethylamine, butylamine and hexylamine.

Acylation of these compounds with acetic anhydride, propionic anhydride, caproic acid chloride, stearic acid chloride and succinic acid anhydride yields the corresponding 3-acylates.

(6) *20-oxo-11α-acetoxy-5α-pregnan-3β-ol tosylate* p-Toluene sulphonyl chloride (55 g.) was added to a solution of 20-oxo-11α-acetoxy-5α-pregnan-3β-ol in pyridine and the solution allowed to stand at 5° for 18 hours. Addition of water precipitated the tosylate in prisms (86.2 g.). Crystallisation from ether gave the tosylate, M.P. 178–179°, $[\alpha]_D$ +37.5° (c. 0.8).

*20-oxo-11α-acetoxy-5αpregn-2-ene*

A solution of the tosylate (81 g.) in collidine (150 ml.) was boiled under reflux for 1½ hours, concentrated, cooled and poured into dilute hydrochloric acid. The crystalline precipitate was filtered off, dried, and taken up in n-hexane before filtering down a column (4 x 2" dia.) of alumina. Elution with n-hexane: benzene mixtures gave a fraction which recrystallised from methanol to give 20-oxo-11α-acetoxy-5α-pregn-2-one in blades (21 g.), M.P. 114–116°. Recrystallisation from benzene yielded fine needles, M.P. 117–118°, $$[\alpha]_D^{EtOH} +57° \text{ (c. 2)}$$

(Found: C, 76.75; H, 9.57. $C_{23}H_{34}O_3$ requires C, 77.05; H, 9.56%.)

The remaining material was isolated in hexane solution and chromatographed on a column of alumina (500 g.). Elution with n-hexane (1.8 l.) and n-hexane benzene (1:1; 600 ml.) gave a fraction which crystallised from methanol in small prisms (3 g.) M.P. 143–147°, $$[\alpha]_D -105°$$

Recrystallisation from methanol gave 17-iso-20-one-11α-acetoxy-5α-pregn-2-ene in blades, M.P. 150–152°, $$[\alpha]_D^{EtOH} -108° \text{ (c. 2)}$$

(Found: C, 77.03; H, 9.51. $C_{23}H_{34}O_3$ requires C, 77.05; H, 9.56%.)

Alkaline hydrolysis of 20-oxo-11α-acetoxy-5α-pregn-2-ene in aqueous methanolic caustic potash solution yielded the 11α-alcohol which crystallized from ether in small prisms, M.P. 152–154°, $$[\alpha]_D^{EtOH} +120° \text{ (c. 2)}$$

(Found: C, 79.81; H, 10.41. $C_{21}H_{23}O_2$ requires C, 79.70; H, 10.19%.)

*2α,3α-epoxy-11α-acetoxy-5α-20-one*

A solution of monoperphthalic acid (2 moles) in ethyl acetate (120 ml.) was added to a solution of 20 oxo-11α-acetoxy-5α-pregn-2-ene (21 g.) in ethyl acetate (50 ml.) and the reaction mixture allowed to stand at room temperature for 5 hours. The epoxidation product was worked up in the usual manner and crystallized from ether to give 2α,3α-epoxy-11α-acetoxy-5α - pregnan - 20-one in large prisms (13 g.) M.P. 145–147°, $$[\alpha]_D^{EtOH} +40° \text{ (c. 2)}$$

(Found : C, 73.60; H, 8.98. $C_{23}H_{34}O_4$ requires C, 73.76; H, 9.15%.)

*2β-morpholino-11α-acetoxy-5α-pregnan-20-on-3α-ol*

A solution of the 2α,3α-epoxide (5 g.) in morpholine (20 ml.) and water (5 ml.) was boiled under reflux for 22 hours, evaporated to dryness under reduced pressure and the residual gum taken up in acetic acid. The acid solution was diluted with water, filtered and the filtrate basified with 10 N caustic potash solution. The precipitated white solid was filtered off and crystallized from aqueous methanol to give 2β-morpholino-11α-acetoxy-5α-pregnan-20-on-3α-ol in fine needles, M.P. 213–218°, $[\alpha]_D$ +51° (c. 2).

In the same way 2α,3α-epoxy-11α-acetoxy-5α-pregnan-20-one has been converted into the 2β-piperidino-, 2β-methyl-amino-, 2β-diethylamino-, and the 2β-di-isopropyl amino-derivatives thereof.

(7) In the manner described in the foregoing examples 2α,3α-epoxy-5α-pregnan-20β-ol has been converted into the 2β-amino-3α-hydroxy-derivatives, of which the amino-substituent is derived from morpholine, piperidine, dimethylamine, dibutylamine and pentylamine.

In an analogous way 2α,3α-epoxy-16α-methyl-5α- pregnan-20-one (melting point 160–163° C.) and 2α,3α-epoxy-16α-ethyl-5α-pregnan-20-one (melting point 154–156° C.) have been converted into the corresponding 3α-hydroxy-2β-morpholino-,2β-piperidino, 2β - dimethylamino-, 2β-dipropylamino-, and 2β-hexylamino-compounds.

(8) *5α-pregn-2-ene-11,20-dione*

(i) 3β-hydroxy-5α-pregnan-11,20-dione (72 gms.) in pyridine (500 ml.) was treated with p-toluene sulphonyl chloride (75 gms.) and kept at 2–3° for 24 hours. The 3-tosylate was precipitated by the addition of water and crystallized from ether, M.P. 158–159° (80.5 gms.)

$$[\alpha]_D^{EtOH} +57.0°$$

The above tosylate (80 gms.) was added to collidine (240 ml.) and boiled under reflux for 1 hour, cooled and poured into dilute hydrochloric acid. The solid was filtered off, washed, dried and crystallized from hexane-benzene to give crude Δ²-ene (40 g.), M.P. 150–154°. Recrystallisation from methanol gave colourless plates (36.5 gms.), M.P. 154–155°, $$[\alpha]_D^{CHCl_3} +180° \text{ (c. 2) } [\alpha]_D^{EtOH} +166°$$

(Found: C, 78.77; H, 9.46. $C_{21}H_{30}O_2$. ½$CH_3CH$. Requires C,78.4; H, 9.73.)

(ii) A solution of sodium dichromate (322 mg.) in water: conc. sulphuric acid (6.2: 1, 1.1 ml.) was added to a solution of the 11α-alcohol (500 mg.) in acetone (10 ml.) and allowed to stand at room temperature for 1 minute. Addition of water gave a crystalline product which was crystallised from acetone-hexane to give 11,20-dioxo-5α-pregn-2-ene in plates (280 mg.), M.P. 153–154°, $$[\alpha]_D^{EtOH} +163° \text{ (c. 1)}$$

identical (mixed M.P. and infrared absorption spectrum) with an authentic specimen described above.

*2α,3α-epoxy-5α-pregnane-11,20-dione*

5α-pregn-2-one-11,20-dione (43.5 gms.) in ethyl acetate (900 ml.) was treated with 0.8 M perphthalic acid (337 ml.) and left to stand for 5 hours at room temperature. After working up in the usual manner crystallisation from acetonehexane yielded 40.0 gms. M.P. 176–178°, $$[\alpha]_D^{EtOH} +107°$$

(Found: C, 75.88; H, 9.23. $C_{21}H_{30}O_3$ requires C, 76.32; H. 9.15%.)

*2β-morpholino-3α-hydroxy-5α-pregnane-11,20-dione*

The above oxide (10 gms.), morpholine (65 ml.) and water (25 ml.) were boiled under reflux for 120 hours, and water added to precipitate the product. The crude product was dissolved in 2% hydrochloric acid, clarified and the amine precipitated by addition of 10 N KOH. The product was extracted with ether, dried and concentrated to give a product (9.4 g.) M.P. 160–175°. Recrystallisation from ethermethanol gave a product M.P. 180–187°, $$[\alpha]_D^{CHCl_3} +114° \text{ (c. 2)}$$

in good yield. The pure product M.P. 195–198°, $$[\alpha]_D^{CHCl_3} +120° \text{ (c. 2)}$$

was obtained from this by chromatography on alumina in benzene-ethyl acetate solution. (Found: C, 72.34; H, 9.43; N, 3.18. $C_{25}H_{30}O_4N$ requires C, 71.91; H, 9.41; N, 3.35%). From the mother liquors was isolated by chromatography in benzene-ethyl acetate solution on alumina, a faster running component in small yield. This had M.P. 175–178°

$$[\alpha]_{DI}^{CHCl_3} +14°$$

and from the known properties of pregnan-20-ones and 17-iso-pregnan-20-ones is assigned the 17α configuration. (Found: C, 71.51; H, 9.45; N, 3.24. $C_{25}H_{39}O_4N$ requires C, 71.91; H, 9.41; N, 3.35%.)

(9) *16α-methyl-5α-pregn-2-ene-11,20-dione*

(i) 16α - methyl - 3β - hydroxy - 5α - pregnane-11,20-dione (8.6 gms.) was converted into the 3β-tosylate (12.4 gms.) by standing with tosyl chloride (10 gms.) in pyridine (86 ml.) for 48 hours at 2–3°. Crystallisation from ether gave the tosylate M.P. 169–170°, $[\alpha]_D^{EtOH}$ +55°

The foregoing tosylate (12.0 gms.) in collidine (60 ml.) was boiled under reflux for ½ hour, cooled and poured into dilute hydrochloric acid. The solid was filtered off and crystallised from aqueous acetone to give the Δ²-ene (5.9 g.), M.P. 142.5–143.5°. (Found: C, 80.78; H, 9.75. $C_{22}H_{32}O_2$ requires C, 80.44; H, 9.83%.)

(ii) 16α-methyl-3β,11α-diacetoxy-5α-pregnan-20 - one (90 gms.) in methanol (1 l.) was boiled with $K_2CO_3$ (20 gms.) in water (200 ml.) for ½ hour and then concentrated to 400 ml. Water was added and the product filtered off and crystallised from 60% aqueous methanol three times to give 16α-methyl-3β,11α-dihydroxy-5α-pregnan-20-one 11-mono acetate (47 g.), M.P. 155.5–156°, $[\alpha]_D^{EtOH}$ +20°

The tosylate of this mono acetate (45 gms.) was prepared by standing with tosyl chloride (4.5 gms.) in pyridine (225 ml.) for 48 hours at 2–3° C. Yield 64.1 gm. M.P. 171–171.5°, $[\alpha]_D^{EtOH}$ +20°

This tosylate (63.5 gms.) was dissolved in hot collidine (280 ml.), boiled for ½ hour, cooled and poured into dilute hydrochloric acid. The solid Δ²-pregnene derivative was filtered off, washed, dried and crystallised from light petrol, M.P. 103–104°, Yield 37.8 gms. It crystallised from methanol in large prisms M.P. 103.5–104.5°, $[\alpha]_D^{EtOH}$ +40°

(Found: C, 77.83; H, 9.66. $C_{24}H_{36}O_3$ requires C, 77.37; H, 9.74%.)

The foregoing 16α-methyl-11α-acetoxy-5α-pregn-2-en-20-one (37 gm.) was saponified in the usual manner and crystallised from acetone to yield the free 11α-hydroxy compound (34 g.) M.P. 178–181°, $[\alpha]_D^{EtOH}$ +95.5°

(Found C, 79.73; H, 10.72. $C_{22}H_{34}O_2$ requires C, 79.95; H, 10.37%.) This 11α-hydroxy compound (31 gm.) was oxidised to the 16α-methyl-5α-pregn-en-11,20-dione described under (i) in acetone (600 ml.) with 1.25 atoms of oxygen as chromic acid in the presence of dilute sulphuric acid. The product was precipitated by the addition of water and crystallised from aqueous acetone to give the dione (30.1 g.), M.P. 143–145°. 30.1 gm. Recrystallised from acetone it had M.P. 144–145°, $[\alpha]_D^{EtOH}$ +155°

(Found C, 80.78; H, 9.75. $C_{22}H_{32}O_2$ requires C, 80.44; H, 9.83%.)

*16α-methyl-2α,3α-epoxy-5α-pregnan-11,20-dione*

The foregoing Δ²-pregnene (29.5 gms.) in ethyl acetate (400 ml.) was treated with 1.47 N perphthalic acid (3 moles) and left at room temperature for 5 hours. After working up in the usual manner the 2α,3α-epoxide, M.P. 158–161°, was obtained by crystallisation from acetone-hexane. Recrystallised, M.P. 163–164°, $[\alpha]_D^{EtOH}$ +103°

(Found C, 77.40; H, 9.60. $C_{22}H_{32}O_3$ requires C, 77.40; H, 9.36%.)

*2β-morpholino-3α-hydroxy-16α-methyl-5α-pregnane-11,20-dione*

The foregoing 2α,3α-epoxide (2 gm.) in morpholine (15 cc.) and water (5 cc.) was boiled for 22 hours, cooled and water added. The precipitated solid was filtered off, washed, dissolved in 2% hydrochloric acid, and reprecipitated by addition of 10 N KOH. The amine (1.7 g.) was recrystallised from aqueous methanol, M.P. 115–117°. Recrystallised from ether, M.P. 188–190°, $[\alpha]_D^{EtOH}$ +71° (c. 2)

2β-piperidino-3α-hydroxy-16α - methyl - 5α - pregnane-11,20 dione was prepared in a similar manner, by using piperidine in place of morpholine. It crystallised from aqueous methanol in needles (1.85 gm.), M.P. 188–192°. Recrystallised from hexane it had M.P. 191–193°, $[\alpha]_D^{EtOH}$ +94°

(Found C, 7.48; H, 10.08; N, 3.26. $C_{27}H_{43}O_3N$ requires C, 75.60; H, 10.11; N, 3.49%.)

(10) *2β-diethanolamino-5α-androstan-3α-ol-17-one*

A suspension of 2α,3α-epoxy-5α-androstan-17-one (5 g.) in diethanolamine (20 ml.) and water (7 ml.) was maintained at 120° for 20 hrs. and the basic fraction isolated in the usual manner. Crystallisation from methanol gave amino-alcohol in needles (3.3 g.) M.P. 226–227°, $[\alpha]_D^{EtOH}$ +190° (c. 1)

(Found C, 70.33; H, 10.16; N, 3.37. $C_{23}H_{39}O_4N$ requires C, 70.20; H, 9.98; N, 3.56%.)

In the same way 2α,3α-epoxy-5α-pregnan-20β-ol, 2α,3α-epoxy-16α-methyl-5α-pregnan-20-one and 2α,3α-epoxy-5α-pregnan-11α-ol-20-one-11α-acetate have been converted into the corresponding 3α-hydroxy-2β-amino-compounds by treatment with ethanolamine.

(11) *2β-morpholino-3α,20β-dihydroxy-5α-pregnan-11-one*

5α-pregnane-11,20-dione-2α,3α-epoxide (12 gms.) suspended in methanol (250 ml.) was reduced with sodium borohydride (5 gm.) over 1 hour. After acidification with dilute acetic acid the 20β-hydroxy-5α-pregnan-11-one-2α,3α-epoxide was precipitated by the addition of water and recrystallised from acetone to give the epoxide (8.9 g.), M.P. 204–205°. (Found C, 76.38; H, 9.81. $C_{21}H_{32}O_3$ requires C, 75.86; H, 9.70%.)

This epoxide (3 gm.) was boiled under reflux with morpholine (15 ml.) and water (15 ml.) for 20 hours, cooled and the product precipitated by addition of water. The 2β-morpholino-3α,20β-dihydroxy-5α-pregnan-11-one (2.7 gm.) was recrystallised from aqueous methanol in prisms, M.P. 244–246°. (Found C, 71.19; H, 9.83; N, 3.12. $C_{25}H_{41}O_4N$ requires C, 71.57; H, 9.85; N. 3.34%.)

We claim:

1. Steroids of the formula:

[Chemical structure diagram showing steroid skeleton with substituents $R_1$, $R_2$ (on nitrogen), XO, Y, $R_3$, $R_4$, $R_5$, and $CH_3-C=R_5$ group]

in which
X is selected from the group consisting of hydrogen and acyl derived from an organic carboxylic acid having 1–12 carbon atoms and phosphoric acid,
$R_1$ and $R_2$ are selected from the group consisting of hydrogen, a lower alkyl, hydroxy-(lower) alkyl and when taken together form with the nitrogen atom a group selected from morpholino and piperidino, Y is selected from the group consisting of $H_2$, $H(\beta OH)$, $H(\alpha OH)$, $H(\alpha Oacyl)$ and O, wherein acyl is derived from an organic carboxylic acid having 1–12 carbon atoms, $R_3$ is selected from the group consisting of hydrogen and lower alkyl, $R_4$ is selected from the group consisting of hydrogen, hydroxyl and acyloxy, wherein acyl is derived from an organic carboxylic acid having 1–12 carbon atoms and phosphoric acid, and $R_5$ is selected from the group consisting of H(OH), H(Oacyl) and O, wherein acyl is derived from an organic carboxylic acid having 1–12 carbon atoms and phosphoric acid.

2. A salt of the compounds of claim 1 wherein the salt is selected from the group consisting of a quaternary ammonium salt derived from a lower alkyl halide and an acid-addition salt derived from an organic saturated carboxylic acid having 1–12 carbon atoms and an inorganic acid selected from the group consisting of phosphoric acid and hydrochloric acid.

References Cited by the Examiner

Batres et al., J. Organic Chem., vol. 26, 1961, pp. 878–880.

LEWIS GOTTS, *Primary Examiner.*

JOHNNIE R. BROWN, *Assistant Examiner.*